US011364742B2

(12) United States Patent
Kuninaka

(10) Patent No.: US 11,364,742 B2
(45) Date of Patent: Jun. 21, 2022

(54) PNEUMATIC TIRE

(71) Applicant: The Yokohama Rubber Co., LTD., Tokyo (JP)

(72) Inventor: Mizuki Kuninaka, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 461 days.

(21) Appl. No.: 16/479,523

(22) PCT Filed: Dec. 7, 2017

(86) PCT No.: PCT/JP2017/044053
§ 371 (c)(1),
(2) Date: Jul. 19, 2019

(87) PCT Pub. No.: WO2018/135170
PCT Pub. Date: Jul. 26, 2018

(65) Prior Publication Data
US 2019/0351709 A1    Nov. 21, 2019

(30) Foreign Application Priority Data
Jan. 20, 2017    (JP) .............................. JP2017-008800

(51) Int. Cl.
| | | |
|---|---|---|
| *B60C 9/28* | (2006.01) | |
| *B60C 9/02* | (2006.01) | |
| *B60C 11/00* | (2006.01) | |
| *B60C 9/22* | (2006.01) | |

(52) U.S. Cl.
CPC ........ *B60C 11/0083* (2013.01); *B60C 9/0292* (2013.01); *B60C 9/28* (2013.01); *B60C 2009/2242* (2013.01); *B60C 2009/283* (2013.01); *B60C 2011/0033* (2013.01)

(58) Field of Classification Search
CPC .... B60C 9/28; B60C 2009/283; B60C 9/0292
USPC ........................................................ 152/538
See application file for complete search history.

(56) References Cited

U.S. PATENT DOCUMENTS

| | | | |
|---|---|---|---|
| 1,698,414 A |  | 1/1929 | Palmer |
| 5,238,038 A | * | 8/1993 | Glover .................... B60C 11/11 152/209.14 |
| 6,401,780 B1 | * | 6/2002 | Patitsas .................... B60C 1/00 152/532 |

(Continued)

FOREIGN PATENT DOCUMENTS

| | | |
|---|---|---|
| JP | H02-164605 | 6/1990 |
| JP | H03-065404 | 3/1991 |

(Continued)

OTHER PUBLICATIONS

Machine Translation: JP-07081313-A, Imai, H, (Year: 2021).*

(Continued)

*Primary Examiner* — Kendra Ly
(74) *Attorney, Agent, or Firm* — Thorpe North & Western

(57) ABSTRACT

A pneumatic tire is provided where a profile line in a tire meridian cross section of a center land portion defined by circumferential grooves and located on a tire equator is curved projecting outward in a tire radial direction. A carcass layer and a reinforcing layer include a recess portion curved projecting inward in the tire radial direction in a bottom region of the center land portion.

15 Claims, 5 Drawing Sheets

(56) References Cited

U.S. PATENT DOCUMENTS

| | | | |
|---|---|---|---|
| 2003/0173011 A1 | 9/2003 | Tsuda et al. | |
| 2011/0024014 A1 | 2/2011 | Ebiko | |
| 2011/0214788 A1 | 9/2011 | Chambriard et al. | |
| 2014/0311640 A1* | 10/2014 | Takahashi | B60C 11/1376 |
| | | | 152/209.15 |
| 2016/0272007 A1* | 9/2016 | Hatanaka | B60C 15/00 |
| 2017/0210173 A1 | 7/2017 | Joulin et al. | |

FOREIGN PATENT DOCUMENTS

| | | | |
|---|---|---|---|
| JP | 07081313 A * | 3/1995 | |
| JP | H07-081313 | 3/1995 | |
| JP | 07195904 A * | 8/1995 | |
| JP | H09-136511 | 5/1997 | |
| JP | 2001-191726 | 7/2001 | |
| JP | 2003-094913 | 4/2003 | |
| JP | 2007-083913 | 4/2007 | |
| JP | 2007-269153 | 10/2007 | |
| JP | 2009-056944 | 3/2009 | |
| JP | 2011-526555 | 10/2011 | |
| JP | 2015-160440 | 9/2015 | |
| WO | WO 02/42094 | 5/2002 | |
| WO | WO 2009/028260 | 3/2009 | |
| WO | WO 2010/000747 | 1/2010 | |
| WO | WO 2016/015964 | 2/2016 | |

OTHER PUBLICATIONS

Machine Translation: JP-07195904-A, Miura, Katsuto, (Year: 2021).*
International Search Report for International Application No. PCT/JP2017/044053 dated Mar. 13, 2018, 6, pages, Japan.

* cited by examiner

PNEUMATIC TIRE

TECHNICAL FIELD

The present technology relates to a pneumatic tire conforming to tire standards including settings of a large width, a high aspect ratio, and a high air pressure and load capacity and particularly relates to a pneumatic tire that can provide an improved shock burst resistance and a maintained high steering stability on dry road surfaces.

BACKGROUND ART

In recent years, with the increased power and weight of vehicles or with the enhanced fashionability of vehicles, much effort has been made to achieve a large width and a low aspect ratio (see, for example, Japan Unexamined Patent Publication Nos. 2007-083913 and 2009-056944). Additionally, in an effort to achieve a large width and a low aspect ratio, standards may be adopted that are equal to or higher than the Extra Load (tire standards that specify an air pressure and a load capacity set to larger values than other standards). For such tires to achieve an excellent steering stability, for example, a tread gauge may be reduced to increase block rigidity. However, a reduced tread gauge may degrade shock burst resistance. Thus, there is a demand for measures for enhancing the shock burst resistance and maintaining an excellent steering stability based on the reduced tread gauge.

SUMMARY

The present technology provides a pneumatic tire that can provide an enhanced shock burst resistance and a maintained high steering stability on dry road surfaces.

A pneumatic tire according to an embodiment of the present technology includes:

an annular tread portion extending in a tire circumferential direction;

a pair of sidewall portions disposed on both sides of the tread portion;

a pair of bead portions disposed inward of the pair of sidewall portions in a tire radial direction;

a carcass layer mounted between the pair of bead portions;

a reinforcing layer disposed on an outer circumferential side of the carcass layer in the tread portion; and two or more circumferential grooves formed in an outer surface of the tread portion and extending in the tire circumferential direction; wherein a profile line in a tire meridian cross section of a center land portion defined by the circumferential grooves and located on a tire equator is curved projecting outward in the tire radial direction; and the carcass layer and the reinforcing layer include a recess portion curved projecting inward in the tire radial direction in a bottom region of the center land portion.

In the present technology, the carcass layer and the reinforcing layer include the recess portion as described above. Thus, even in a case where a rubber gauge of the tread portion is reduced to achieve an excellent steering stability, the recess portion reduces out-surface rigidity of the reinforcing layer to allow the enhancement of shock burst resistance of the center land portion. Additionally, presence of the recess portion increases the rubber gauge and the rubber content of a portion in which the recess portion is formed. However, the region in which the recess portion is formed is limited to the bottom region of the center land portion, and thus a significant increase in rubber content is avoided to allow steering stability to be maintained.

In an embodiment of the present technology, the tread portion preferably has a rubber gauge of from 5 mm to 15 mm. The tread portion thus having a sufficiently small rubber gauge is advantageous for achieving an excellent steering stability. In the present technology, the "rubber gauge of the tread portion" is the sum of a groove depth of the circumferential groove adjacent to the center land portion and an under-groove gauge (distance from a groove bottom to the reinforcing layer) of the circumferential groove.

In an embodiment of the present technology, when the pneumatic tire is in a deflated state, a maximum recess amount D of the recess portion is preferably from 0.5 mm to 2.0 mm with respect to a straight line connecting intersection points between an outer surface of the reinforcing layer and normal lines drawn in the tire meridian cross section from edges of the center land portion to the reinforcing layer. Appropriately recessing the recess portion in this manner enables a good balance between an effect of the recess portion (improvement in the shock burst resistance) and an increase in rubber content due to providing the recess portion (an effect, on the steering stability, of the increase in rubber content). This is advantageous for providing the steering stability and the shock burst resistance in a balanced and compatible manner.

In an embodiment of the present technology, a width of the recess portion is preferably from 10% to 40% of a width of the center land portion. Setting the width of the recess portion within an appropriate range in this manner enables a good balance between the effect of the recess portion (improvement in the shock burst resistance) and an increase in rubber content due to providing the recess portion (the effect, on the steering stability, of the increase in rubber content). This is advantageous for providing the steering stability and the shock burst resistance in a balanced and compatible manner.

In an embodiment of the present technology, the recess portion preferably has a maximum recess position located within 10% of the width of the center land portion from the tire equator. Disposing the maximum recess position at or near the tire equator in this manner allows the recess portion to more effectively produce the effect of improving the shock burst resistance.

In an embodiment of the present technology, an auxiliary reinforcing layer is preferably provided on an outer circumferential side of the recess portion. Providing the auxiliary reinforcing layer in this manner can reinforce the bottom region of the center land portion to further improve the shock burst resistance. Additionally, in terms of manufacturing, the presence of the auxiliary reinforcing layer has the advantage of assisting curving of the carcass layer and the reinforcing layer to facilitate the formation of the recess portion with an intended shape.

In this case, the auxiliary reinforcing layer preferably includes a rubber composition having a larger tensile stress at an elongation of 300% than a rubber composition forming the tread portion. Alternatively, the auxiliary reinforcing layer preferably has a structure in which a reinforcing cord is embedded in rubber. Identifying a material of the auxiliary reinforcing layer in this manner allows, in either configuration, the auxiliary reinforcing layer to enhance the effect of improving the shock burst resistance. Additionally, in the latter structure (the auxiliary reinforcing layer in which the reinforcing cord is embedded in rubber), using the reinforcing cord has the advantage of suppressing an increase in rubber content. In the present technology, the tensile stress at an elongation of 300% has a value measured in accordance with JIS (Japan Industrial Standard) K6253.

Additionally, in a case where the auxiliary reinforcing layer is used, the width of the auxiliary reinforcing layer is preferably from 10% to 40% of the width of the center land portion. Limiting the width of the auxiliary reinforcing layer in this manner enable a good balance between an effect of the auxiliary reinforcing layer (improvement in the shock burst resistance) and, for example, an increase in rubber content due to addition of the auxiliary reinforcing layer (the effect, on the steering stability, of the increase in rubber content). This is advantageous for providing the steering stability and the shock burst resistance in a balanced and compatible manner.

DETAILED DESCRIPTION

Configurations of embodiments of the present technology will be described in detail below with reference to the accompanying drawings.

Figure 1:
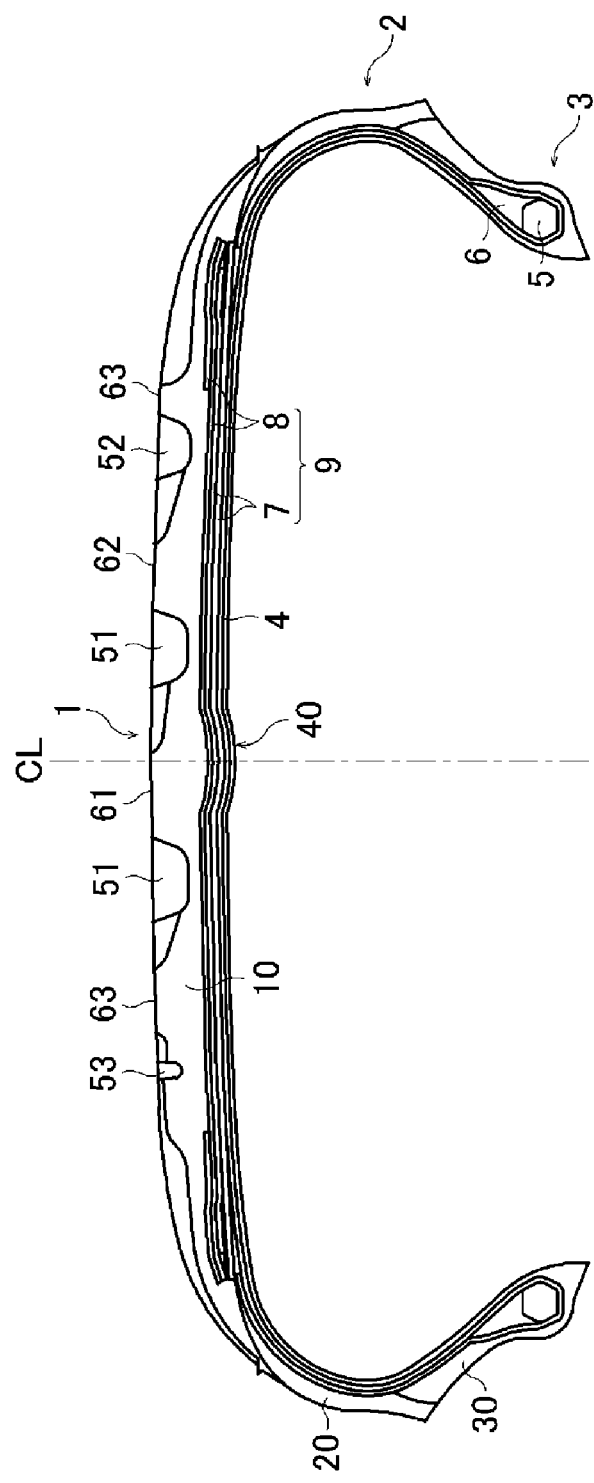
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. Note that "CL" in FIG. 1 denotes the tire equator.

A carcass layer 4 is mounted between the left-right pair of bead portions 3. The carcass layer 4 includes a plurality of reinforcing cords extending in the tire radial direction and is folded back around a bead core 5 disposed in each of the bead portions 3 from a vehicle inner side to a vehicle outer side.

Additionally, bead fillers 6 are disposed on the periphery of the bead cores 5, and each bead filler 6 is enveloped by a main body portion and a folded back portion of the carcass layer 4. A plurality (in the illustrated example, two layers) of belt layers 7 are embedded on an outer circumferential side of the carcass layer 4 in the tread portion 1. The belt layers 7 each include a plurality of reinforcing cords that are inclined with respect to the tire circumferential direction, and the direction of the reinforcing cords of the different layers intersect each other. In these belt layers 7, the inclination angle of the reinforcing cords with respect to the tire circumferential direction is set in the range, for example, of from 10° to 40°. Moreover, a belt reinforcing layer 8 (in the illustrated example, two layers including a belt reinforcing layer 8 covering the entire width of the belt layer 7 and a pair of the belt reinforcing layers 8 covering end portions of the belt layer 7) is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°. The belt layers 7 and the belt reinforcing layers 8 may hereinafter collectively be referred to as a "reinforcing layer 9".

A tread rubber layer 10 is disposed on the outer circumferential side of the carcass layer 4 in the tread portion 1. A side rubber layer 20 is disposed on the outer circumferential side (outward in the tire lateral direction) of the carcass layer 4 in each of the sidewall portions 2. A rim cushion rubber layer 30 is disposed on the outer circumferential side (outward in the tire lateral direction) of the carcass layer 4 in each of the bead portions 3. The tread rubber layer 10 may have a multilayer structure including two types of rubber layers (cap tread rubber layer, undertread rubber layer) with differing physical properties layered in the tire radial direction.

In the present technology, such a common pneumatic tire includes a recess portion 40 formed by a curve in a part of the reinforcing layer 9, as described below. Thus, the basic cross-sectional structure of the pneumatic tire which does not include the recess portion 40 is not limited to the above-described structure.

In an embodiment of the present technology, in the outer surface of the tread portion 1, two or more circumferential grooves 50 extending in the tire circumferential direction are formed, and a plurality of land portions 60 are defined by the circumferential grooves 50. In particular, in the illustrated example, a pair of inner main grooves 51 are disposed on both sides of the tire equator CL, one outer main groove 52 disposed on a first side of the tire equator CL and outward of the inner main groove 51 in the tire lateral direction, and one circumferential narrow groove 53 disposed on a second side of the tire equator CL and outward of the inner main groove 51 in the tire lateral direction. A center land portion 61 is defined between the pair of inner main grooves 51. An intermediate land portion 62 is defined between the inner main groove 51 and the outer main groove 52. A shoulder land portion 63 is defined outward of the main groove (the outer main groove 52 on the first side of the tire equator CL, the inner main groove 51 on the second side of the tire equator CL) located on the outermost side in the tire lateral direction. In this case, the circumferential narrow groove 53 is present in the shoulder land portion 63 on the second side of the tire equator CL. However, the circumferential narrow groove 53 has a sufficiently smaller groove width and a sufficiently smaller groove depth than the inner main groove 51 and the outer main groove 52 and is thus considered not to substantially define a land portion. These land portions 60 can include lug grooves 70 extending in the tire lateral direction. However, at least the center land portion 61 is preferably rib-shaped such that at least one end of each of the lug grooves 70 terminates within the center land portion 61 and that the center land portion 61 is continuous in the tire circumferential direction.

Figure 2:
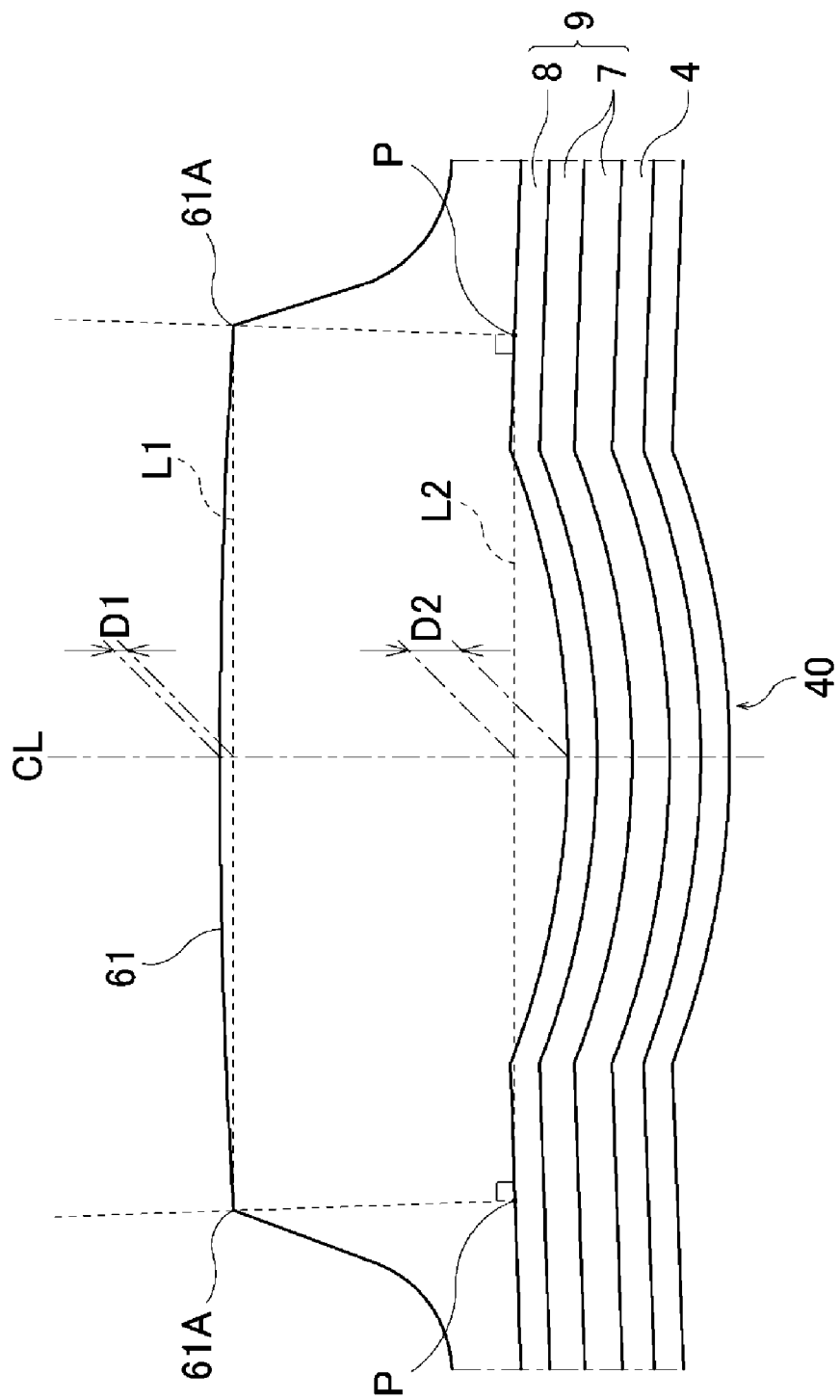
FIG. 2 is an enlarged explanatory diagram illustrating a center land portion of FIG. 1.

A profile line in a tire meridian cross-section of the center land portion 61 defined as described above and located on the tire equator CL is curved projecting outward in the tire radial direction as illustrated in FIG. 2. Specifically, when the tire is in a deflated state, the profile line of the center land portion 61 is formed projecting outward in the tire radial direction with respect to a straight line L1 connecting both edges 61A of the center land portion 61. Also, the carcass layer 4 and the reinforcing layer 9 include, in a bottom region of the center land portion 61, the recess portion 40 curved projecting inward in the tire radial direction. Specifically, the carcass layer 4 and the reinforcing layer 9 are recessed with respect to a straight line L2 to form the recess portion 40, the straight line L2 connecting intersection points P between the outer surface of the reinforcing layer 9 and normal lines drawn in the tire meridian cross section from each of the edges 61A of the center land portion 61 to the reinforcing layer 9.

Note that, in a case in which, for example, an innerliner layer and a tie rubber layer are present on the inner circumferential side of the carcass layer 4, and the carcass layer 4 and the reinforcing layer 9 include the recess portion 40, these tire components are curved projecting inward in the tire radial direction similarly to the carcass layer 4 and the reinforcing layer 9. In other words, in the present technology, it can be assumed that the tire components in the tread portion 1 except for the tread rubber layer 10 are curved projecting inward in the tire radial direction to form the recess portion 40.

As described above, the profile line of the center land portion 61 is curved projecting outward in the tire radial direction, whereas the carcass layer 4 and the reinforcing layer 9 include the recess portion 40. Thus, even in a case where the rubber gauge of the tread portion is reduced to achieve an excellent steering stability, the recess portion 40 reduces out-of-plane rigidity of the reinforcing layer 9 to allow the enhancement of shock burst resistance of the center land portion 61. Additionally, the presence of the recess portion 40 increases the rubber gauge and the rubber content of the portion in which the recess portion 40 is formed. However, the region in which the recess portion 40 is formed is limited to the bottom region of the center land portion 61, and thus a significant increase in rubber content is avoided to allow steering stability to be maintained.

When the rubber gauge of the tread portion 1 is reduced to achieve an excellent steering stability as described above, the tread portion 1 preferably has a rubber gauge G of from 5 mm to 15 mm. In the present technology, the presence of the recess portion 40 in the bottom region of the center land portion 61 makes the rubber gauge G larger at the position of the recess portion 40 than at the other portions. Thus, as described above, the rubber gauge G of the tread portion 1 is defined by the sum of a groove depth g1 of the circumferential groove (inner main groove 51) adjacent to the center land portion 61 and an under-groove gauge g2 (distance from the groove bottom to the reinforcing layer) of the circumferential groove (inner main groove 51). In this case, a rubber gauge G of less than 5 mm makes the tread portion 1 excessively thin. This prevents a sufficient groove depth g1 or a sufficient under-groove gauge g2 from being ensured, and the original driving performance of the tire may be adversely affected. A rubber gauge G of greater than 15 mm prevents the tread portion 1 from being sufficiently thin. This prevents the effect of enhancing steering stability performance from being sufficiently achieved.

As described above, the profile line in the tire meridian cross-section of the center land portion 61 is curved projecting outward from the straight line L1 in the tire radial direction. In this case, a maximum distance D1 from the straight line L1 to the profile line of the center land portion 61 can be set to, for example, from 0.05 mm to 0.8 mm.

In the recess portion 40, the carcass layer 4 and the reinforcing layer 9 are recessed inward from the straight line L2 in the tire radial direction. However, a maximum recess amount D2 of the recess portion 40 with respect to the straight line L2 is preferably from 0.5 mm to 2.0 mm. Appropriately recessing the recess portion 40 in this manner enables a good balance between the effect of the recess portion 40 (improvement in the shock burst resistance) and an increase in rubber content due to providing the recess portion 40 (the effect, on the steering stability, of the increase in rubber content). This is advantageous for providing the steering stability and the shock burst resistance in a balanced and compatible manner. In this case, a maximum recess amount D2 of less than 0.5 mm substantially prevents the recess portion 40 from being recessed with respect to the straight line L2. Then, the recess portion 40 fails to sufficiently achieve the effect of improving the shock burst resistance. A maximum recess amount D2 of greater than 2.0 mm increases the effect of an increase in rubber content due to providing the recess portion 40 even though the position of the recess portion 40 is limited to the bottom region of the center land portion 61. This complicates satisfactory maintenance of the steering stability.

Figure 3:
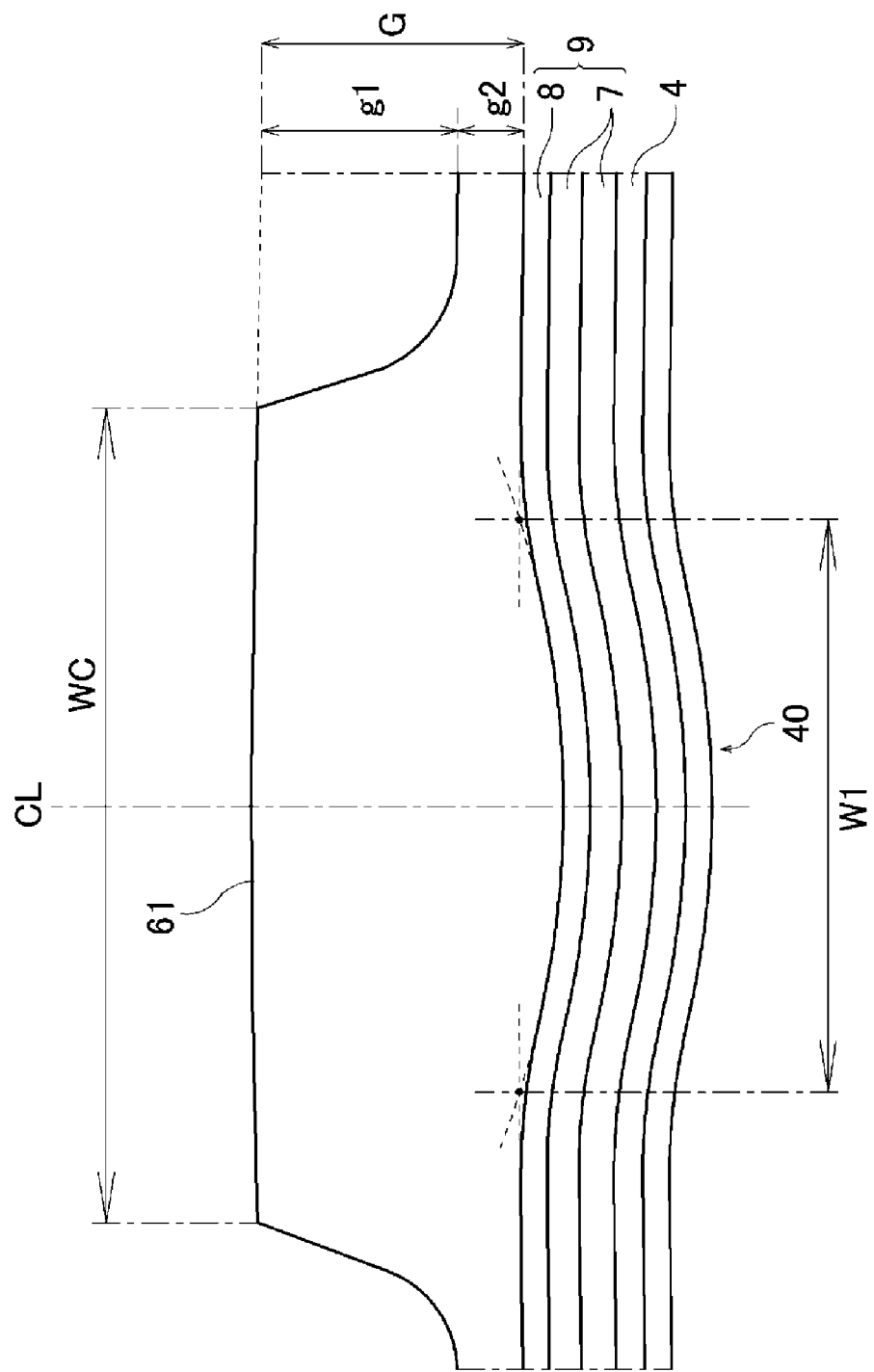
FIG. 3 is an enlarged explanatory diagram illustrating the center portion of FIG. 1.

As described above, the recess portion 40 is provided in the bottom region of the center land portion 61. However, a width W1 of the recess portion 40 is preferably from 10% to 40% of a width WC of the center land portion 61. Setting the width W1 of the recess portion 40 within an appropriate range in this manner enables a good balance between the effect of the recess portion 40 (improvement in the shock burst resistance) and an increase in rubber content due to providing the recess portion (the effect, on the steering stability, of the increase in rubber content). This is advantageous for providing the steering stability and the shock burst resistance in a balanced and compatible manner. In this case, when the width W1 of the recess portion is less than 10% of the width WC of the center land portion 61, the recess portion 40 is excessively small, leading to substantially no difference between the present configuration and a configuration in which the recess portion 40 is not provided. Then, the recess portion 40 fails to sufficiently achieve the effect of improving the shock burst resistance. When the width W1 of the recess portion 40 is greater than 40% of the width WC of the center land portion 61, the effect of an increase in rubber content due to providing the recess portion 40 is increased. This complicates satisfactory good maintenance of the steering stability. As illustrated in FIG. 3, in a case where the recess portion 40 is smoothly continuous with the carcass layer 4 and the other portions of the reinforcing layer 9, the width W1 of the recess portion 40 is defined as the distance in the tire meridian cross section between intersection points each between an extension line of the outer surface of the recess portion 40 of the reinforcing layer 9 and an extension line of the outer surface of the other portion of the reinforcing layer 9.

The recess portion 40 can be disposed at a discretionary position so long as the position is within the bottom region of the center land portion 61. However, the recess portion 40 preferably has a maximum recess position located within 10% of the width WC of the center land portion 61 from the tire equator CL. By disposing the maximum recess position of the recess portion 40 at or near the tire equator in this manner, the recess portion 40 can more effectively produce the effect of improving the shock burst resistance. In this case, when the maximum recess position of the recess portion 40 is not located within 10% of the width WC of the center land portion 61 from the tire equator CL, the recess portion 40 is more significantly misaligned with the tire equator CL. This complicates satisfactory production of the effect of improving the shock burst resistance.

Figure 4:
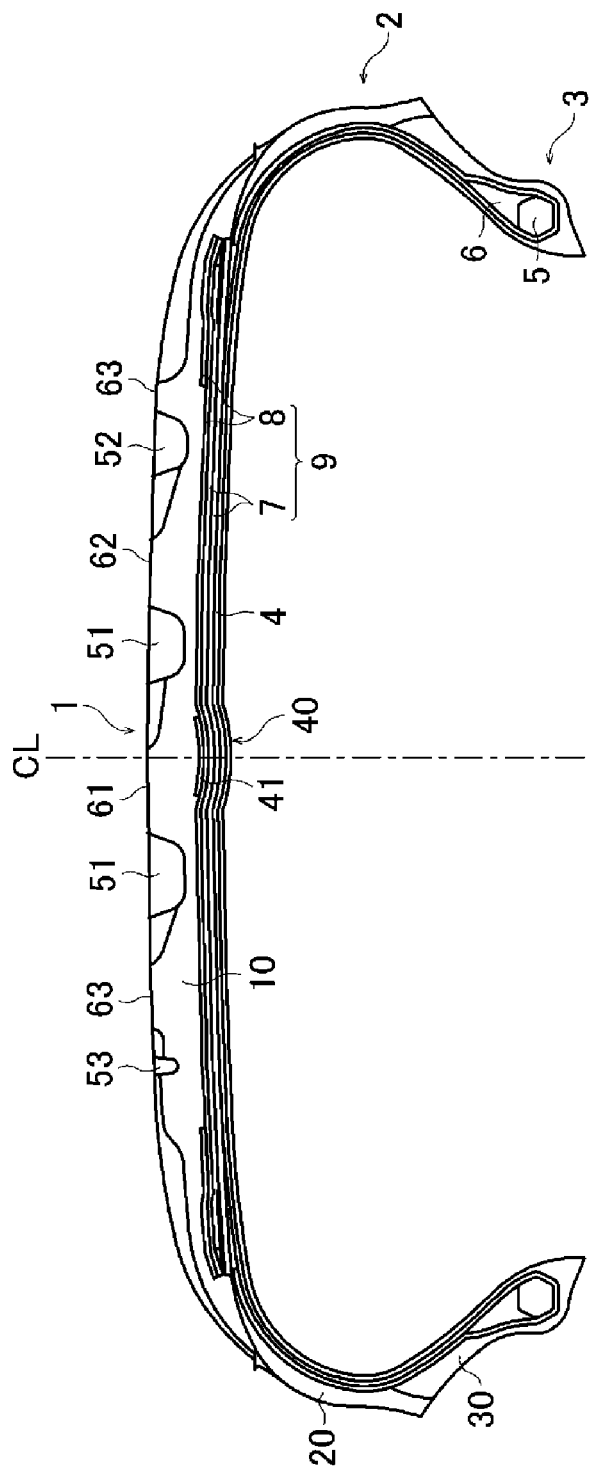
FIG. 4 is a meridian cross-sectional view of a pneumatic tire according to another embodiment of the present technology.
Figure 5:
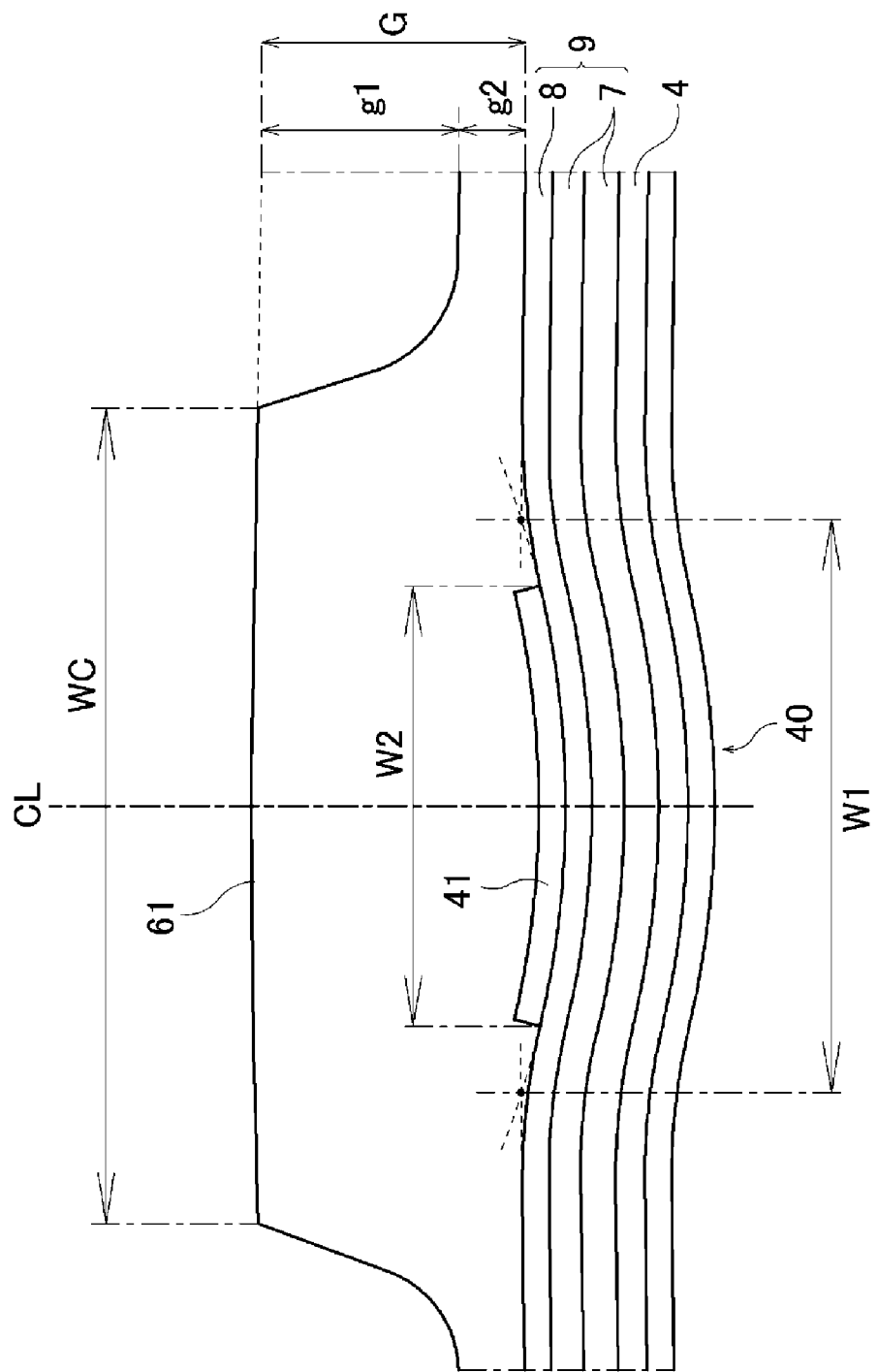
FIG. 5 is an enlarged cross-sectional view of a center land portion of FIG. 4.

In the present technology, as illustrated in FIG. 4, an auxiliary reinforcing layer 41 is preferably provided on the outer circumferential side of the recess portion 40. Specifically, preferably, the auxiliary reinforcing layer 41 is provided on the outer circumferential side of the reinforcing layer 9 in the bottom region of the tread land portion 61 (belt reinforcing layer 8 in the illustrated example) to cover a central portion of the reinforcing layer 9 (bottom region of the tread land portion 61). Providing the auxiliary reinforcing layer 41 in this manner can reinforce the bottom region of the center land portion 61 to further improve the shock burst resistance. Additionally, in terms of manufacturing, the presence of the auxiliary reinforcing layer 41 has the advantage of assisting curving of the carcass layer 4 and the reinforcing layer 9 to facilitate the formation of the recess portion 40 with an intended shape.

For example, like the belt layer 7 and the belt reinforcing layer 8, the auxiliary reinforcing layer 41 can include a plurality of auxiliary cords embedded in rubber and inclined with respect to the tire circumferential direction (at an inclination angle of from 10° to 40° with respect to the tire circumferential direction) or a plurality of auxiliary cords oriented in the tire circumferential direction (at an angle of, for example, from 0° to 5° with respect to the tire circumferential direction). The auxiliary cords can include, for example, steel cords that are similar or dissimilar to the auxiliary cords forming the belt layer 7 or organic fiber cords that are similar or dissimilar to the organic fiber cords forming the belt reinforcing layer 8. Alternatively, as the auxiliary reinforcing layer 41, a rubber layer including no auxiliary cords can be adopted. In this case, the auxiliary reinforcing layer 41 preferably includes a rubber composition having a larger tensile stress at an elongation of 300% than a rubber composition forming the tread rubber layer 10 (both a cap tread rubber layer and an undertread rubber layer in a case where the tread rubber layer 10 includes these two layers). In either configuration, using a suitable material as the auxiliary reinforcing layer 41 allows the auxiliary reinforcing layer 41 to further enhance the effect of improving the shock burst resistance. In particular, in a case where a structure including the auxiliary cords embedded in rubber is adopted as the auxiliary reinforcing layer 41, the use of the auxiliary cords has the advantage of suppressing an increase in rubber content.

In a case where the auxiliary reinforcing layer 41 is used in this manner, the auxiliary reinforcing layer 41 may have a thickness of, for example, from 1.0 mm to 1.3 mm, and the width W2 of the auxiliary reinforcing layer 41 is preferably set to from 10% to 40% of the width WC of the center land portion 61. Specifying the dimensions of the auxiliary reinforcing layer 41 in this manner enables a good balance between the effect of the auxiliary reinforcing layer 41 (improvement in the shock burst resistance) and, for example, an increase in rubber content due to the addition of the auxiliary reinforcing layer (the effect, on the steering stability, of the increase in rubber content). This is advantageous for providing the steering stability and the shock burst resistance in a balanced and compatible manner. In this case, the width W2 of the auxiliary reinforcing layer 41 being less than 10% of the width WC of the center land portion 61 makes the auxiliary reinforcing layer 41 excessively small. This prevents sufficient achievement of the effect of providing the auxiliary reinforcing layer 41 (improvement in the shock burst resistance). The width W2 of the auxiliary reinforcing layer 41 being greater than 40% of the width WC of the center land portion 61 increases the used amount of the auxiliary reinforcing layer 41. Additionally, the presence of the auxiliary reinforcing layer 41 increases the size of the recess portion 40 and significantly increases the rubber content. This complicates the suppression of the effect on the steering stability.

EXAMPLE

Twenty-four types of pneumatic tires were manufactured as Conventional Example 1, Comparative Examples 1 and 2, and Examples 1 to 21. The pneumatic tires have a tire size of 315/30ZR21 (105Y) and the basic structure illustrated in FIG. 1. The following are set as indicated in Tables 1 and 2: the shape of profile line of center land portion, rubber gauge of tread portion, recess portion provided, shape of recess portion, width of recess portion, maximum recess amount, maximum recess position, auxiliary reinforcing layer provided, and width of auxiliary reinforcing layer.

For the section "shape of profile line of center land portion" in Tables 1 and 2, the profile line of the center land portion curved projecting outward in the tire radial direction in the tire meridian cross-section is represented as "outwardly projecting", and the profile line of the center land portion curved projecting inward in the tire radial direction in the tire meridian cross-section is represented as "inwardly projecting". Similarly, for the section "shape of recess portion" in Tables 1 and 2, the recess portion curved projecting outward in the tire radial direction in the tire meridian cross-section is represented as "outwardly projecting", and the recess portion curved projecting inward in the tire radial direction in the tire meridian cross-section is represented as "inwardly projecting".

In the section "width of recess portion" in Tables 1 and 2, the ratio of the width W1 of the recess portion to the width WC of the center land portion (W1/WC×100%) is also shown, and in the section "width of the auxiliary reinforcing layer" in Tables 1 and 2, the ratio of the width W2 of the auxiliary reinforcing layer to the width WC of the center land portion (W2/WC×100%) is also shown. For all the examples, the width WC of the center land portion is 40 mm. In the section "maximum recess position" in Tables 1 and 2, the distance from the tire equator to the maximum recess position is represented as the ratio of the distance to the width WC of the center land portion (%).

Comparative Example 2 is an example in which the carcass layer and the reinforcing layer include a portion curved projecting outward in the tire radial direction in the bottom region of the center land portion. In other words, Comparative Example 2 is an example in which the portion corresponding to the recess portion in Example 1 protrudes outward in the tire radial direction instead of being recessed inward in the tire radial direction. This portion is not strictly the "recess portion". However, the portion is considered to be a "recess portion curved projecting outward in the tire radial direction" for the sake of convenience, and the shape of the recess is represented as "outwardly projecting". In this example, the "maximum recess amount" actually represents the amount projecting outward in the tire radial direction, and the "maximum recess position" actually represents the position of a portion protruding outward farthest in the tire radial direction.

These 24 types of pneumatic tires were evaluated for the shock burst resistance and the steering stability performance on dry road surfaces (steering stability) by the evaluation methods described below, and the results are also shown in Tables 1 and 2.

Shock Burst Resistance

The test tires were assembled on wheels having a rim size of 21×11.0 J (ETRTO (European Tyre and Rim Technical Organisation) standard rim) and adjusted to an air pressure of 220 kPa (Reinforced/Extra Load Tires). Tire failure tests were conducted in which a plunger with a plunger diameter of 19±1.6 mm was pressed against the central portion of the tread under a condition of a load speed (plunger pressing speed) of 50.0±1.5 m/min, and tire strength (tire failure energy) was measured. Evaluation results are expressed as real number values of measured failure energy (unit: J). Larger values indicate a higher failure energy and a superior shock burst resistance. A failure energy value of 640 J or greater means that a sufficient shock burst resistance is achieved. A failure energy value of 660 J or more means that an excellent shock burst resistance is achieved.

Steering Stability

The test tires were assembled on wheels having a rim size of 21×11.0 J (ETRTO standard rim), adjusted to an air pressure of 260 kPa, and mounted on a test vehicle. The tires were subjected to a sensory evaluation by test drivers on a test course with dry road surfaces. Evaluation results are expressed as index values, with the results of Conventional Example 1 being assigned an index value of 100. Larger index values indicate a superior steering stability. An index value of "97" or more means that a sufficient steering stability is achieved with known levels maintained. An index value of "99" or more means that the effect of maintaining the steering stability is excellent.

TABLE 1

|  |  | Conventional Example 1 | Comparative Example 1 | Comparative Example 2 | Example 1 |
|---|---|---|---|---|---|
| Shape of profile line of center land portion |  | Outwardly projecting | Inwardly projecting | Outwardly projecting | Outwardly projecting |
| Rubber gauge of tread portion | mm | 10 | 10 | 10 | 10 |
| Recess portion provided |  | No | Yes | Yes | Yes |
| Shape of recessed portion |  | — | Inwardly projecting | Outwardly projecting | Inwardly projecting |
| Width of recess portion | mm | — | 10 | 10 | 10 |
| (W1/WC × 100 | %) | — | (25) | (25) | (25) |
| Maximum recess amount | mm | — | 1.0 | 1.0 | 1.0 |
| Maximum recess position | % | — | 0 | 0 | 0 |
| Auxiliary reinforcing layer provided |  | — | No | No | No |
| Width of auxiliary reinforcing layer | mm | — | — | — | — |
| (W2/WC × 100 | %) |  |  |  |  |
| Shock burst resistance | J | 620 | 620 | 610 | 670 |
| Steering stability | Index value | 100 | 100 | 100 | 100 |

|  |  | Example 2 | Example 3 | Example 4 | Example 5 |
|---|---|---|---|---|---|
| Shape of profile line of center land portion |  | Outwardly projecting | Outwardly projecting | Outwardly projecting | Outwardly projecting |
| Rubber gauge of tread portion | mm | 5 | 12 | 10 | 10 |
| Recess portion provided |  | Yes | Yes | Yes | Yes |
| Shape of recessed portion |  | Inwardly projecting | Inwardly projecting | Inwardly projecting | Inwardly projecting |
| Width of recess portion | mm | 10 | 10 | 10 | 10 |
| (W1/WC × 100 | %) | (25) | (25) | (25) | (25) |
| Maximum recess amount | mm | 1.0 | 1.0 | 0.3 | 0.5 |
| Maximum recess position | % | 0 | 0 | 0 | 0 |
| Auxiliary reinforcing layer provided |  | No | No | No | No |
| Width of auxiliary reinforcing layer | mm | — | — | — | — |
| (W2/WC × 100 | %) |  |  |  |  |
| Shock burst resistance | J | 640 | 690 | 650 | 660 |
| Steering stability | Index value | 103 | 97 | 100 | 100 |

|  |  | Example 6 | Example 7 | Example 8 | Example 9 |
|---|---|---|---|---|---|
| Shape of profile line of center land portion |  | Outwardly projecting | Outwardly projecting | Outwardly projecting | Outwardly projecting |
| Rubber gauge of tread portion | mm | 10 | 10 | 10 | 10 |
| Recess portion provided |  | Yes | Yes | Yes | Yes |
| Shape of recessed portion |  | Inwardly projecting | Inwardly projecting | Inwardly projecting | Inwardly projecting |
| Width of recess portion | mm | 10 | 10 | 2 | 4 |
| (W1/WC × 100 | %) | (25) | (25) | (5) | (10) |
| Maximum recess amount | mm | 2.0 | 2.5 | 1.0 | 1.0 |
| Maximum recess position | % | 0 | 0 | 0 | 0 |
| Auxiliary reinforcing layer provided |  | No | No | No | No |
| Width of auxiliary reinforcing layer | mm | — | — | — | — |
| (W2/WC × 100 | %) |  |  |  |  |
| Shock burst resistance | J | 675 | 680 | 650 | 660 |
| Steering stability | Index value | 99 | 98 | 100 | 100 |

TABLE 2

|  |  | Example 10 | Example 11 | Example 12 | Example 13 |
|---|---|---|---|---|---|
| Shape of profile line of center land portion |  | Outwardly projecting | Outwardly projecting | Outwardly projecting | Outwardly projecting |
| Rubber gauge of tread portion | mm | 10 | 10 | 10 | 10 |
| Recess portion provided |  | Yes | Yes | Yes | Yes |
| Shape of recessed portion |  | Inwardly projecting | Inwardly projecting | Inwardly projecting | Inwardly projecting |
| Width of recess portion | mm | 16 | 18 | 10 | 10 |
| (W1/WC × 100 | %) | (40) | (45) | (25) | (25) |
| Maximum recess amount | mm | 1.0 | 1.0 | 1.0 | 1.0 |
| Maximum recess position | % | 0 | 0 | 5 | 10 |
| Auxiliary reinforcing layer provided |  | No | No | No | No |
| Width of auxiliary reinforcing layer | mm | — | — | — | — |
| (W2/WC × 100 | %) |  |  |  |  |
| Shock burst resistance | J | 675 | 680 | 670 | 660 |
| Steering stability | Index value | 99 | 98 | 100 | 100 |
|  |  | Example 14 | Example 15 | Example 16 | Example 17 |
| Shape of profile line of center land portion |  | Outwardly projecting | Outwardly projecting | Outwardly projecting | Outwardly projecting |
| Rubber gauge of tread portion | mm | 10 | 10 | 10 | 10 |
| Recess portion provided |  | Yes | Yes | Yes | Yes |
| Shape of recessed portion |  | Inwardly projecting | Inwardly projecting | Inwardly projecting | Inwardly projecting |
| Width of recess portion | mm | 10 | 10 | 10 | 10 |
| (W1/WC × 100 | %) | (25) | (25) | (25) | (25) |
| Maximum recess amount | mm | 1.0 | 1.0 | 1.0 | 1.0 |
| Maximum recess position | % | 15 | 0 | 0 | 0 |
| Auxiliary reinforcing layer provided |  | No | Rubber 1 | Rubber 2 | Cords |
| Width of auxiliary reinforcing layer | mm | — | 10 | 10 | 10 |
| (W2/WC × 100 | %) |  | (25) | (25) | (25) |
| Shock burst resistance | J | 650 | 680 | 675 | 700 |
| Steering stability | Index value | 100 | 100 | 100 | 100 |
|  |  | Example 18 | Example 19 | Example 20 | Example 21 |
| Shape of profile line of center land portion |  | Outwardly projecting | Outwardly projecting | Outwardly projecting | Outwardly projecting |
| Rubber gauge of tread portion | mm | 10 | 10 | 10 | 10 |
| Recess portion provided |  | Yes | Yes | Yes | Yes |
| Shape of recessed portion |  | Inwardly projecting | Inwardly projecting | Inwardly projecting | Inwardly projecting |
| Width of recess portion | mm | 10 | 10 | 10 | 10 |
| (W1/WC × 100 | %) | (25) | (25) | (25) | (25) |
| Maximum recess amount | mm | 1.0 | 1.0 | 1.0 | 1.0 |
| Maximum recess position | % | 0 | 0 | 0 | 0 |
| Auxiliary reinforcing layer provided |  | Cords | Cords | Cords | Cords |
| Width of auxiliary reinforcing layer | mm | 2 | 4 | 16 | 18 |
| (W2/WC × 100 | %) | (5) | (10) | (40) | (45) |
| Shock burst resistance | J | 680 | 690 | 705 | 710 |
| Steering stability | Index value | 100 | 100 | 99 | 98 |

As can be seen from Tables 1 and 2, each of Examples 1 to 21 had enhanced the shock burst resistance and maintained an excellent steering stability compared to Conventional Example 1, and provided these performances in a balanced and compatible manner. On the other hand, Comparative Examples 1 and 2 failed to produce the effect of improving the shock burst resistance due to the inappropriate shape of the profile line of the center land portion and the inappropriate shape of the recess portion.

The invention claimed is:

1. A pneumatic tire, comprising:
   an annular tread portion extending in a tire circumferential direction;
   a pair of sidewall portions disposed on both sides of the tread portion;
   a pair of bead portions disposed inward of the pair of sidewall portions in a tire radial direction;
   a carcass layer mounted between the pair of bead portions;
   a reinforcing layer disposed on an outer circumferential side of the carcass layer in the tread portion; and
   circumferential grooves formed in an outer surface of the tread portion and extending in the tire circumferential direction; wherein
   when the pneumatic tire is in a deflated state, a profile line in a tire meridian cross section of a center land portion defined by the circumferential grooves and located on a tire equator is curved projecting outward in the tire radial direction;
   the carcass layer and the reinforcing layer comprise a recess portion curved projecting inward in the tire radial direction in a bottom region of the center land portion; and
   a width of the recess portion is from 10% to 40% of a width of the center land portion.

2. The pneumatic tire according to claim 1, wherein, when the pneumatic tire is in a deflated state, a maximum recess amount D of the recess portion is from 0.5 mm to 2.0 mm with respect to a straight line connecting intersection points between an outer surface of the reinforcing layer and normal lines drawn in the tire meridian cross section from edges of the center land portion to the reinforcing layer.

3. The pneumatic tire according to claim 1, wherein a maximum recess position of the recess portion is located within 10% of a width of the center land portion from the tire equator.

4. The pneumatic tire according to claim 1, further comprising an auxiliary reinforcing layer on an outer circumferential side of the recess portion.

5. The pneumatic tire according to claim 4, wherein the auxiliary reinforcing layer comprises a rubber composition having a larger tensile stress at an elongation of 300% than a rubber composition forming the tread portion.

6. The pneumatic tire according to claim 4, wherein the auxiliary reinforcing layer has a structure in which a reinforcing cord is embedded in rubber.

7. The pneumatic tire according to claim 4, wherein a width of the auxiliary reinforcing layer is from 10% to 40% of a width of the center land portion.

8. The pneumatic tire according to claim 1, wherein the tread portion has a rubber gauge of from 5 mm to 15 mm.

9. The pneumatic tire according to claim 8, wherein, when the pneumatic tire is in a deflated state, a maximum recess amount D of the recess portion is from 0.5 mm to 2.0 mm with respect to a straight line connecting intersection points between an outer surface of the reinforcing layer and normal lines drawn in the tire meridian cross section from edges of the center land portion to the reinforcing layer.

10. The pneumatic tire according to claim 9, wherein a maximum recess position of the recess portion is located within 10% of a width of the center land portion from the tire equator.

11. The pneumatic tire according to claim 10, further comprising an auxiliary reinforcing layer on an outer circumferential side of the recess portion.

12. The pneumatic tire according to claim 11, wherein the auxiliary reinforcing layer has a structure in which a reinforcing cord is embedded in rubber.

13. The pneumatic tire according to claim 12, wherein a width of the auxiliary reinforcing layer is from 10% to 40% of a width of the center land portion.

14. The pneumatic tire according to claim 11, wherein the auxiliary reinforcing layer comprises a rubber composition having a larger tensile stress at an elongation of 300% than a rubber composition forming the tread portion.

15. The pneumatic tire according to claim 14, wherein a width of the auxiliary reinforcing layer is from 10% to 40% of a width of the center land portion.

* * * * *